(12) United States Patent
Weng

(10) Patent No.: US 6,233,133 B1
(45) Date of Patent: May 15, 2001

(54) CAPACITOR

(76) Inventor: Shui-Te Weng, P.O. Box 82-144, Taipei (TW)

(*) Notice: Subject to any disclaimer, the term of this patent is extended or adjusted under 35 U.S.C. 154(b) by 0 days.

(21) Appl. No.: 09/305,650

(22) Filed: May 5, 1999

(51) Int. Cl.[7] .............................. H01G 4/00; H01G 4/228
(52) U.S. Cl. ...................... 361/301.3; 361/309; 361/540
(58) Field of Search .................................. 361/117, 126, 361/127, 301.3, 309, 321.5, 329–330, 809, 517–519, 535–537, 540, 306.1; 338/21

(56) References Cited

U.S. PATENT DOCUMENTS

| 5,412,532 | * | 5/1995 | Nishimori et al. ................. 361/301.4 |
| 5,821,672 | * | 10/1998 | Oyama ................................. 310/344 |

* cited by examiner

*Primary Examiner*—Anthony Dinkins
(74) *Attorney, Agent, or Firm*—A & J

(57) ABSTRACT

A capacitor includes a housing, a connector disposed within the housing and having an end provided with a first U-shaped terminal and another end provided with a second U-shaped terminal, the first U-shaped terminal having a first leg extending downwardly from a lower end of the first U-shaped terminal, the second U-shaped terminal having a second leg extending downwardly from a lower end of the second U-shaped terminal, an ebonite member mounted between the first and second U-shaped terminals, a grounding terminal arranged intermediate of the ebonite member, an insulating material mounted between the first leg of the first U-shaped terminal and the second leg of the second U-shaped terminal, a first voltage sensitive resistor having a leg soldered to the first U-shaped terminal and another leg soldered to a lower end of the grounding terminal, and a second voltage-sensitive resistor having a leg soldered to the second U-shaped terminal and another leg soldered to the grounding terminal.

1 Claim, 3 Drawing Sheets

CAPACITOR

BACKGROUND OF THE INVENTION

1. Field of the Invention

This invention is related to an improvement in the structure of a capacitor.

2. Description of the Prior Art

An arrangement of conductors and dielectrics used to secure a capacitance for the storage of electrical energy in the electric field. The essential feature of all capacitors is a system of conductors separated by dielectrics. Modem capacitors, both fixed and variable, are of many forms, such as those of metal foil and paraffin paper dielectric, metal foil and mica dielectric, metal plates with vacuum, compressed gases or air as dielectric and aluminum and tantalum electrolytics. The capacitor with metal foil and dielectric is widely used in air conditioners, washing machines, electric fans, lighting systems, ignition systems, motor starting systems, and the like. Nevertheless, the conventional capacitor of such type is easily damaged by pulses thereby making it unfit for practical use.

It has been found that the conventional capacitor is often damaged by pulses under the following conditions:

1. Directly struck by thunder;
2. Improper grounding;
3. Magnetism;
4. Indirect struck by thunder;
5. Switching on or off; and
6. Static.

Therefore, it is an object of the present invention to provide an improvement in the structure of a capacitor which can obviate and mitigate the above-noted drawbacks.

SUMMARY OF THE INVENTION

This invention is related to an improvement in the structure of a capacitor.

It is the primary object of the present invention to provide an improvement in the structure of a capacitor which can prevent the capacitor from being damaged by pulses.

It is another object of the present invention to provide an improvement in the structure of a capacitor which is durable in use.

According to a preferred embodiment of the present invention, a capacitor includes a housing, a connector disposed with in the housing and having an end provided with a first U-shaped terminal and another end provided with a second U-shaped terminal, the first U-shaped terminal having a first leg extending downwardly from a lower end of the first U-shaped terminal, the second U-shaped terminal having a second leg extending downwardly from a lower end of the second U-shaped terminal, an ebonite member mounted between the first and second U-shaped terminals, a grounding terminal arranged intermediate of the ebonite member, an insulating material mounted between the first leg of the U-shaped terminal and the second leg of the second U-shaped terminal, a first voltage sensitive resistor having a leg soldered to the first U-shaped terminal and another leg soldered to a lower end of the grounding terminal, and a second voltage-sensitive resistor a leg soldered to the second terminal and another leg soldered to the grounding terminal.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
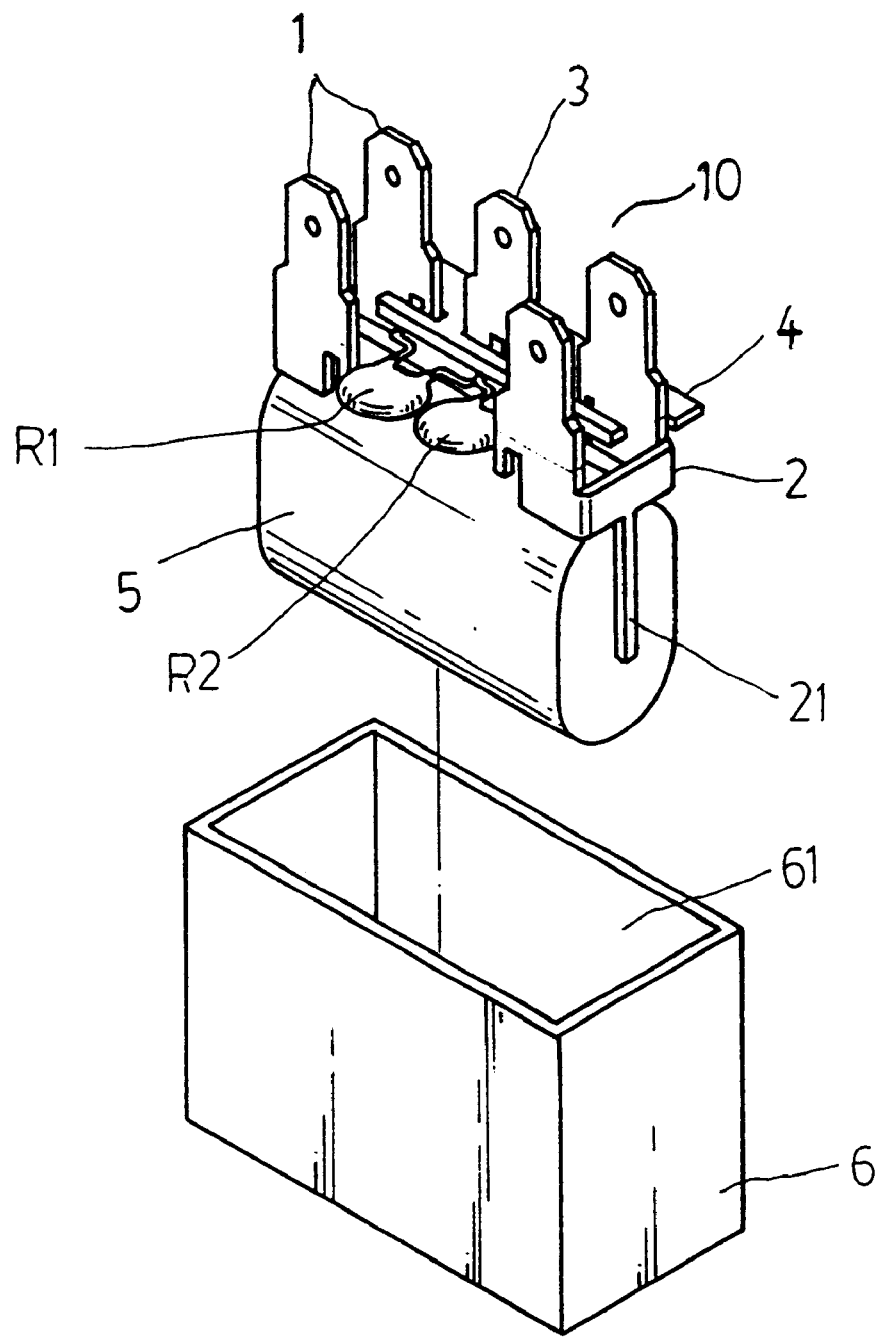
FIG. 1 is an exploded view of the present invention.

For the purpose of promoting an understanding ofthe principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
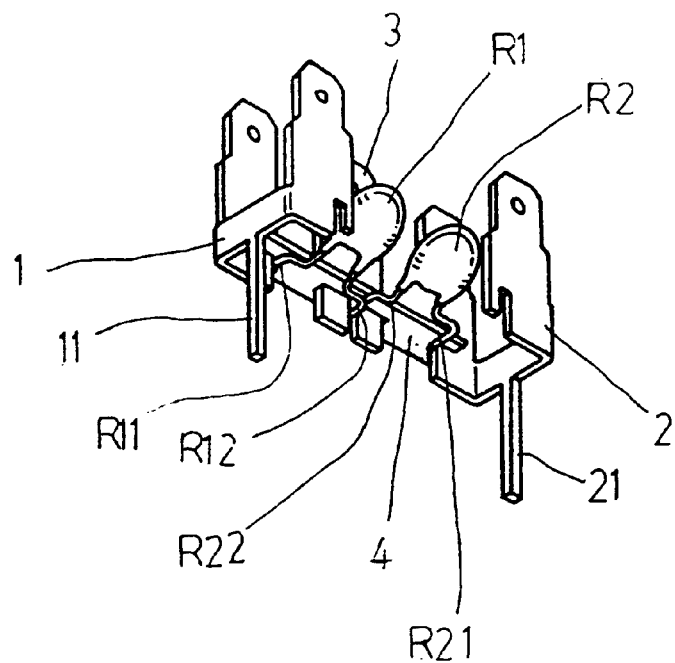
FIG. 2 is a perspective view of the connector.

With reference to the drawings and in particular to FIGS. 1 and 2 thereof, the capacitor according to the present invention generally comprises a housing 6, an insulating material 5 and a connector 10.

The connector 10 is formed with a first U-shaped terminal 1 at one end and a second U-shaped terminal at another end. The first and second U-shaped terminals 1 and 2 are respectively provided with legs 11 and 21 extending downwardly therefrom. An ebonite member 4 is mounted between the first and second U-shaped terminals 1 and 2. A grounding terminal 3 is arranged at the intermediate portion of the ebonite member 4.

Figure 3:
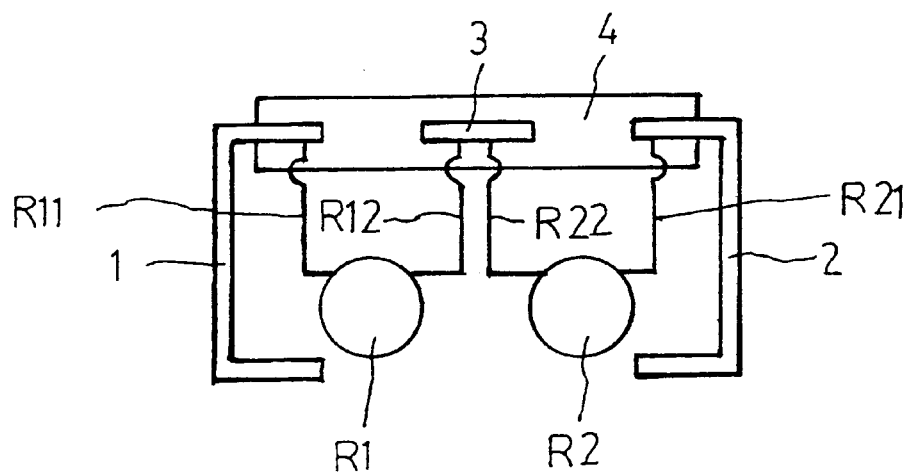
FIG. 3 is a schematic view showing the structure of the present invention.

Referring to FIG. 2, a voltage sensitive resistor R1 has a leg R11 soldered to the first connector 1 and another leg R12 soldered to the lower end of the grounding terminal 3. Similarly, a voltage-sensitive resistor R2 has a leg R21 soldered to the second connector 2 and another leg R22 soldered to the grounding terminal 3. FIG. 3 is a schematic view illustrating the relationship among the first terminal 1, the second terminal 2, the grounding terminal 3, the first voltage-sensitive resistor R1 and the second voltage-sensitive resistor R2. The insulating material 5 is first disposed between the two legs 11 and 21 of the terminal 10 and then fitted in the interior 61 of the housing 6. Thereafter, glue or the like is filled into the housing 6 to keep the an insulating material 5 and the connector 10 within the housing 6, with the U-shaped terminals 1 and 2 and the grounding terminal 3 extending upwardly out of the housing 6, as shown in FIG. 4.

Figure 4:
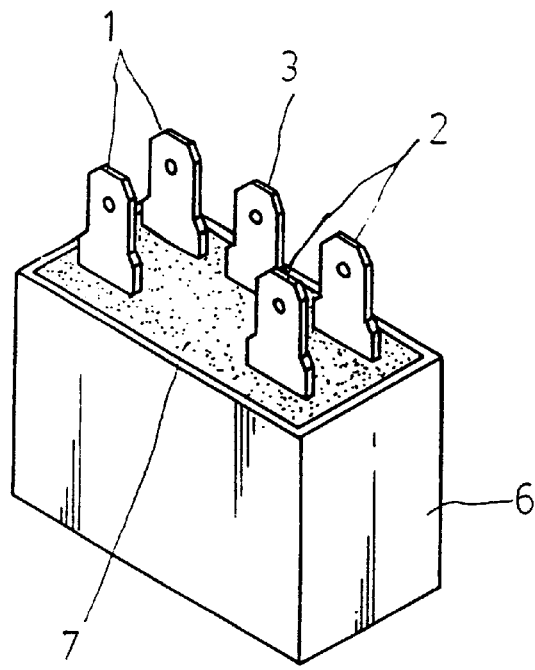
FIG. 4 is a perspective view of the present invention.
Figure 5:
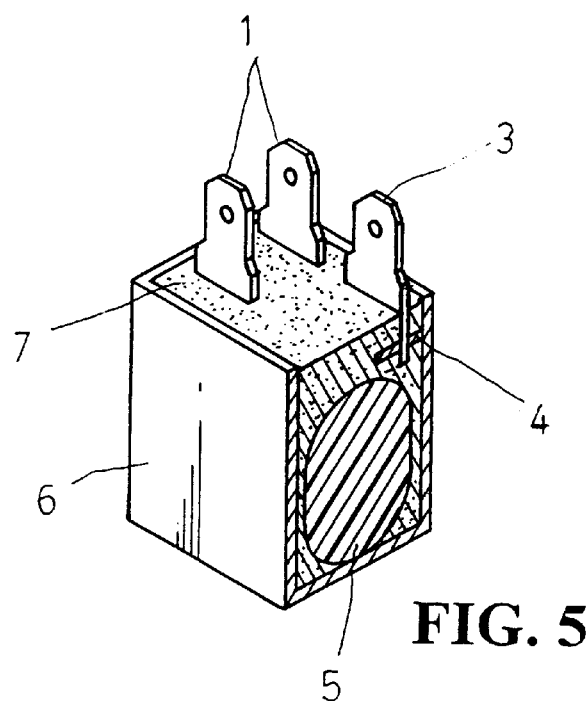
FIG. 5 is a cutaway view of the present invention.

As shown in FIG. 4, the present invention is similar to the prior art capacitor in appearance, except that the former is provided with a grounding terminal 3. The voltage sensitive resistor R1 has a leg R11 soldered to the first connector 1 and another leg R12 soldered to the lower end of the grounding terminal 3, while the voltage-sensitive resistor R2 has a leg R21 soldered to the second terminal 2 and another leg R22 soldered to the grounding terminal 3, thereby forming a closed circuitry. When the two U-shaped terminals 1 and 2 are connected with an electrical device, the high voltage applied to the two U-shaped grounding terminals 1 and 2 will be connected to the grounding terminal 3 via the voltage sensitive resistors R1 and R2 thereby effectively eliminating the pulse and preventing the capacitor from being damaged.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:
1. A capacitor comprising:

a housing;

a connector disposed within said housing and having an end provided with a first U-shaped terminal and another end provided with a second U-shaped terminal, said first U-shaped terminal having a first leg extending downwardly from a lower end of said first U-shaped terminal, said second U-shaped terminal having a second leg extending downwardly from a lower end of said second U-shaped terminal;

an ebonite member mounted between said first and second U-shaped terminals;

a grounding terminal arranged intermediate of said ebonite member;

an insulating material mounted between said first leg of said first U-shaped terminal and said second leg of said second U-shaped terminal;

a first voltage sensitive resistor having a leg soldered to said first U-shaped terminal and another leg soldered to a lower end of said grounding terminal; and a second voltage-sensitive resistor having a leg soldered to said U-shaped terminal and another leg soldered to said grounding terminal.

* * * * *